United States Patent
Cevahir et al.

(10) Patent No.: US 10,294,385 B2
(45) Date of Patent: *May 21, 2019

(54) DIPPING MATERIAL FOR CORD FABRICS AND A PRODUCTION METHOD THEREOF

(71) Applicant: KORDSA TEKNIK TEKSTIL A.S., Kocaeli (TR)

(72) Inventors: Nacide Nurcin Cevahir, Kocaeli (TR); Ali Ersin Acar, Istanbul (TR); Serkan Bas, Kocaeli (TR)

(73) Assignee: KORDSA GLOBAL ENDUSTRIYEL IPLIK VE KORD BEZI SANAYI VE TICARET ANONIM SIRKETI, Kocaeli (TR)

(*) Notice: Subject to any disclaimer, the term of this patent is extended or adjusted under 35 U.S.C. 154(b) by 0 days.

This patent is subject to a terminal disclaimer.

(21) Appl. No.: 14/441,121

(22) PCT Filed: Dec. 6, 2013

(86) PCT No.: PCT/IB2013/060693
§ 371 (c)(1),
(2) Date: May 6, 2015

(87) PCT Pub. No.: WO2014/091376
PCT Pub. Date: Jun. 19, 2014

(65) Prior Publication Data
US 2015/0259560 A1    Sep. 17, 2015

(30) Foreign Application Priority Data
Dec. 13, 2012  (TR) ................................ 2012/14628

(51) Int. Cl.
*C08J 5/06* (2006.01)
*C09J 109/06* (2006.01)
(Continued)

(52) U.S. Cl.
CPC .............. *C09D 133/02* (2013.01); *C08J 5/06* (2013.01); *C08L 9/02* (2013.01); *C08L 9/06* (2013.01);
(Continued)

(58) Field of Classification Search
CPC ............. D06M 13/395; D06M 15/233; D06M 15/263; D06M 15/693; D06M 15/3562;
(Continued)

(56) References Cited

U.S. PATENT DOCUMENTS

| 4,472,463 A | 9/1984 | Solomon |
| 4,476,191 A | 10/1984 | Girgis |

(Continued)

FOREIGN PATENT DOCUMENTS

| CN | 102414362 A | 4/2012 |
| JP | 02127571 A | 5/1990 |

(Continued)

OTHER PUBLICATIONS

Machine translation of JP 2011-069020 A.*
(Continued)

*Primary Examiner* — Kregg T Brooks
(74) *Attorney, Agent, or Firm* — Pergament & Cepeda LLP; Milagros A. Cepeda; Edward D. Pergament

(57) ABSTRACT

The present invention relates to a dipping solution for cord fabrics and a production method thereof comprising the steps of adding acrylic resin (polymer) into water (11), adjusting pH value (12), adding epoxy to the composition (13), adding polyisocyanate to the composition (14), adding latex to the composition (15), obtaining the dipping material (16); enabling the synthetic fiber and the rubber used in cord fabric reinforced rubber materials production to be attached to each other by providing an interface between two said
(Continued)

materials; not as hazardous as RFL for human health and also being environmental friendly.

10 Claims, 2 Drawing Sheets

(51) Int. Cl.

| | | |
|---|---|---|
| C09J 109/08 | (2006.01) | |
| C08L 9/06 | (2006.01) | |
| C08L 9/08 | (2006.01) | |
| D06M 15/263 | (2006.01) | |
| D06M 15/55 | (2006.01) | |
| D06M 15/693 | (2006.01) | |
| D06M 13/395 | (2006.01) | |
| C09D 133/02 | (2006.01) | |
| C08L 33/02 | (2006.01) | |
| C09J 133/02 | (2006.01) | |
| C08L 63/00 | (2006.01) | |
| C09J 163/00 | (2006.01) | |
| C09D 109/08 | (2006.01) | |
| C09D 109/06 | (2006.01) | |
| C09D 163/00 | (2006.01) | |
| D06M 15/356 | (2006.01) | |
| D06M 15/233 | (2006.01) | |
| C08L 9/02 | (2006.01) | |

(52) U.S. Cl.
CPC ............... *C08L 9/08* (2013.01); *C08L 33/02* (2013.01); *C08L 63/00* (2013.01); *C09D 109/06* (2013.01); *C09D 109/08* (2013.01); *C09D 163/00* (2013.01); *D06M 13/395* (2013.01); *D06M 15/233* (2013.01); *D06M 15/263* (2013.01); *D06M 15/3562* (2013.01); *D06M 15/55* (2013.01); *D06M 15/693* (2013.01); *C08J 2321/00* (2013.01)

(58) Field of Classification Search
CPC .... C08L 33/02; C08L 9/06; C08L 9/08; C08L 63/00; C09D 133/02; C09D 109/06; C09D 109/08; C09D 163/00; C09J 133/02; C09J 109/06; C09J 109/08; C09J 163/00

See application file for complete search history.

(56) References Cited

U.S. PATENT DOCUMENTS

| | | | |
|---|---|---|---|
| 5,118,545 A | | 6/1992 | Burlett et al. |
| 5,286,783 A | * | 2/1994 | Hisaki .................. C08F 236/04 |
| | | | 524/510 |
| 5,565,507 A | | 10/1996 | Marco et al. |
| 5,939,159 A | * | 8/1999 | Shiono .................... C08L 63/00 |
| | | | 427/239 |
| 9,394,647 B2 | | 7/2016 | Ikeda et al. |
| 2004/0249053 A1 | | 12/2004 | Huynh-Tran et al. |
| 2008/0121327 A1 | * | 5/2008 | Matsumura .......... B60C 9/0042 |
| | | | 152/451 |
| 2012/0041113 A1 | | 2/2012 | Ikeda et al. |

FOREIGN PATENT DOCUMENTS

| | | |
|---|---|---|
| JP | 03097965 A | 4/1991 |
| JP | 2002309220 A | 10/2002 |
| JP | 2007046210 A | 2/2007 |
| JP | 2011069020 A | 4/2011 |
| JP | 2012224962 A | 11/2012 |

OTHER PUBLICATIONS

International Search Report dated Aug. 12, 2014, for International Patent Application No. PCT/TR2014/000123.
International Preliminary Report on Patentability dated Apr. 10, 2015, for International Patent Application No. PCT/TR2014/000123.
Database WPI Week 201278 Thomson Scientific, London, Great Britain, AN 2012-P82251 XP002733056.
Database WPI Week 200364 Thomson Scientific, London, Great Britain, AN 2003-67355 XP002733057.
Database WPI Week 201128 Thomson Scientific, London, Great Britain, AN 2011-D61653 XP002733058.
International Search Report and Written Opinion dated Mar. 18, 2014, for International Patent Application No. PCT/IB2013/060693.
Database WPI Week 199026 Thomson Scientific, London, Great Britain, AN 1990-196184 XP002720716.
Office Action mailed by the State Intellectual Patent Office of P.R. China dated Mar. 2, 2017, for corresponding Patent Application No. 201380065132.6. (With English Translation).
Office Action issued by the Korean Intellectual Property Office (KIPO) dated Aug. 23, 2016, for corresponding Korean Patent Application No. 10-2015-7017143. (With English Translation).
Non-Final Office Action mailed by the USPTO dated Sep. 8, 2017, for corresponding U.S. Appl. No. 14/651,419.

* cited by examiner

| Examples of compositions | Functional acrylic polymer | Epoxy | Polyisocyanate | Acrylic resin % | Epoxy % | Polyisocyanate % | Latex % | Strip adhesion (indexed) |
|---|---|---|---|---|---|---|---|---|
| 1 | Acrodur 950 | EX313 | IL6 | 3.78 | 2.52 | 7.40 | 86.30 | 102 |
| 2 | Acrodur 950 | EX313 | BN27 | 1.38 | 0.92 | 20.39 | 77.32 | 88 |
| 3 | Acrodur 950 | EX614 | IL6 | 4.07 | 1.99 | 7.98 | 85.96 | 66 |
| 4 | Acrodur 950 | EX614 | BN27 | 1.41 | 0.69 | 20.94 | 76.96 | 90 |
| 5 | Acrodur 3515 | EX313 | IL6 | 6.23 | 2.05 | 6.03 | 85.69 | 91 |
| 6 | Acrodur 3515 | EX313 | BN27 | 2.57 | 0.85 | 18.83 | 77.75 | 84 |
| 7 | Acrodur 3515 | EX614 | IL6 | 6.61 | 1.60 | 6.41 | 85.38 | 99 |
| 8 | Acrodur 3515 | EX614 | BN27 | 2.64 | 0.64 | 19.30 | 77.43 | 89 |
| Control | RFL | | | | | | | 100 |

Figure 2

DIPPING MATERIAL FOR CORD FABRICS AND A PRODUCTION METHOD THEREOF

This application is a National Stage Application under 35 U.S.C. § 371 of PCT International Application No. PCT/IB2013/060693 filed Dec. 6, 2013, which claims the benefit of Turkish Application No. 2012/14628, filed Dec. 13, 2012, all of which are hereby incorporated by reference in their entireties.

FIELD OF THE INVENTION

The present invention relates to a dipping solution for cord fabrics which enables the synthetic fiber and the rubber to be attached to each other by providing a phase between the said two structures, and which is environmental friendly, and a production method thereof.

BACKGROUND OF THE INVENTION

Since the chemical structures of synthetic fibers used in the cord fabric production and the rubber are considerably different from each other, the said materials are incompatible with each other in terms of their chemical and physical structures. The synthetic fibers have high strength and low elongation whereas the rubbers contrarily are polymeric materials which have high elongation and low strength. The polar groups (amide, hydroxyl and carbonyl groups) present in the structure of the synthetic fibers are incompatible with the non-polar structures of the rubber. This incompatibility is eliminated with water-based Resorcinol-Formaldehyde-Latex (RFL) adhesive solutions which form a phase between the cord and the rubber and enable the rubber and the fiber to be attached to each other.

Main function of RFL is to serve as adhesive attaching two incompatible structures by forming phase between fiber and rubber. RF functional group within RFL is attached to the polar groups of fiber, Latex (L) group is attached to the fiber with vulcanization and the rubber-fiber composite structure is formed. The vehicle tire application amongst the most significant product examples wherein the said composite structure is used. The water based RFL adhesives are applied on cord fabric during "dipping" process which is the final step of cord fabric production. The strength of the bonds formed between the rubber and the cord is examined with adhesion tests. Adhesion is very important parameter in high tenacity cord reinforced rubber products. Because cord-rubber adhesion is a critical factor which affects the tire performance.

Formaldehyde-free dipping solutions for rubber materials reinforced with cord have been reported in various studies.

U.S. Patent document no US20120041113, an application known in the state of the art, discloses preparing a composition comprising epoxy, blocked isocyanate, epoxy curing agent and vinyl pyridine latex.

International Patent document no WO9600749, another application known in the state of the art, discloses applying dipping solutions formulated with three functional epoxy resins, styrene-butadiene-vinyl pyridine and styrene-butadiene-acrylonitrile-acrylic acid latex to the polyethylene terephthalate (PET) material and adhesion strength with rubber.

U.S. Pat. No. 5,118,545, another application known in the state of the art, discloses the synthesis of an aramide with multiple double bonds. It is stated that the synthesized resin is applied on the aramide based cord fabric and the double bonds in aramide resin are vulcanized with the double bonds in rubber, and the amide groups provide physical adhesion to the aramide fiber.

U.S. Pat. No. 4,472,463, another application known in the state of the art, discloses dipping non-adhesive activated PET fibers with two step process dipping. The first step dipping comprises aromatic glycidyl ester epoxy and blocked isocyanate, while the second step dipping comprises two various latex. The first latex is styrene-butadiene-vinyl pyridine copolymer, and the other one is acrylic acid-methyl methacrylate-styrene copolymer. It is stated that higher adhesion values are obtained in H-adhesion tests compared to RFL dipping solution.

U.S. Patent document no US20040249053, another application in the state of the art wherein an environmental friendly dipping material is disclosed. In that application, the maleinized polybutadiene is reacted with polyethylene glycol and become water soluble. The PET cords modified with epoxy are first dipped with this resin and then with styrene-butadiene-vinyl pyridine latex. However the stripping-adhesion strength of the rubber with PET cords dipped with this resin is lower than the fabrics with RFL.

RFL adhesive formulation has been used as adhesive material in all synthetic fiber reinforced materials for over half century because of its stable structural characteristics and low cost. However, both resorcinol and formaldehyde are the hazardous chemicals which create a great risk for human and environmental health. Therefore, their use has to be limited. Regarding this subject, feedbacks have come from international organizations and customers. It is known that the resorcinol causes itching and rash when it contacts the skin, irritates the eye and shows toxic properties in liver and cardiovascular systems.

Formaldehyde is riskier than resorcinol for human health and safety. In 2004, formaldehyde is classified as group 2A chemical (possible carcinogen in humans) by a group of scientists in International Agency for research on Cancer (IARC) of World Health Organization, and as group 1 (carcinogen for humans) for a group of scientists. In 2009, formaldehyde is included in list of chemicals causing leukemia by IARC. According to these, formaldehyde is suggested to be gene mutagen. Even low amounts of formaldehyde (1 ppm) cause eye, nose and throat irritation.

Although formaldehyde resins have advantage in terms of cost, both producers and consumers search for alternatives because of the reasons expressed above.

SUMMARY OF THE INVENTION

The objective of the present invention is to provide a dipping material for cord fabrics which comprises more environment friendly chemicals than formaldehyde and resorcinol.

Another objective of the present invention is to provide production method for dipping solution of cord fabrics which takes shorter time than the method used in the state of the art.

A further objective of the present invention is to provide a dipping solution for cord fabrics which is in white color and thus makes it possible to produce colorful cords.

DETAILED DESCRIPTION OF THE INVENTION

The dipping material for cord fabrics and a production method thereof developed to fulfill the objective of the present invention is illustrated in the accompanying figure, in which;

FIG. 2 is the view of the table wherein the strip adhesion values of 8 different inventive mixtures, the composition ratios of which are different, and Resorcinol-Formaldehyde-Latex (RFL) adhesive solutions are compared.

Figure 1:
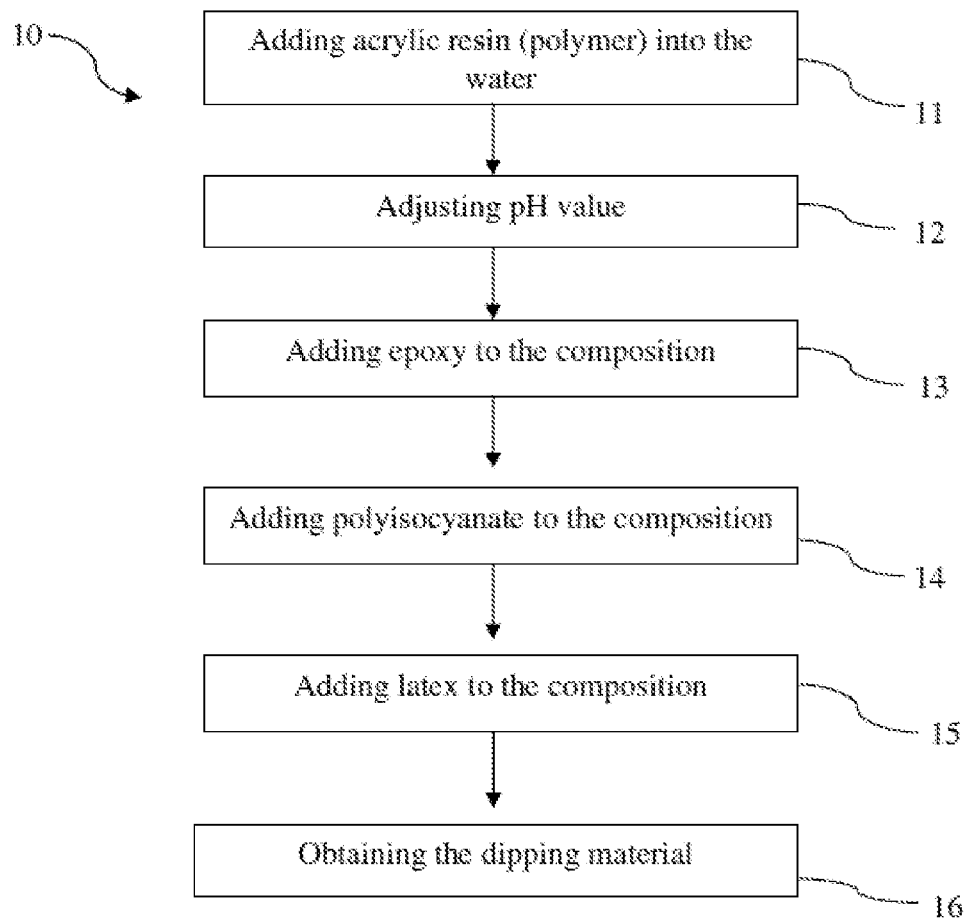
FIG. 1 is the view of the flowchart of the method.

The production method for the dipping solution for cord fabrics (10) comprises the steps of:
  adding acrylic resin (polymer) into water (11),
  adjusting pH value (12),
  adding epoxy to the composition (13),
  adding polyisocyanate to the composition (14),
  adding latex to the composition (15),
  obtaining the dipping material (16).

In the inventive production method for dipping material for cord fabrics (10), first functional acrylic resin (polymer) material comprising carboxylic acid is added into the water (1). The functionality of the resin comprising carboxylic acid, at least one of the monomers such as acrylic acid, methacrylic acid, itaconic acid, crotonic acid, cinnamic acid, maleic acid is used. In the preferred embodiment of the invention, the amount of carboxylic acid within acrylic polymer is between 1-50% by mole. In one embodiment of the invention this rate is kept between 1-30%.

Then, pH value of this composition comprising water and acrylic polymer is adjusted (2). In the preferred embodiment of the invention, ammonium hydroxide is added to the composition until the pH value of the composition is 10-11.

After pH is adjusted to the desired level, epoxy is added into the composition (3). In the preferred embodiment of the invention, the epoxy which is used is water soluble or water based dispersion. At least one of the materials such as glycidyl based glycerol and sorbitol epoxy, phenol novalac epoxy, cresol novalac epoxy is used as epoxy. However their use is not limited to these. Any epoxy which is water soluble or can be prepared in dispersion can be used in this invention.

Then polyisocyanate is added to the composition (4). In the preferred embodiment of the invention, polyurethane prepolymer comprising water based blocked polyisocyanate or water based blocked isocyanate groups is used. At least one of tetramethylene diisocyanaye, hexamethylene diisocyanate (1,6-diisocyanatohexane), octamethylene diisocyanate, decamethylene diisocyanae, dodecamethylene diisocyanate, aromatic diisocyanates 2,4- or 2,6-tolylene diisocyanate, tetramethyilxyliene diisocyanate, p-xylene diisocyanate, 2,4'- or 4-4'-diisocyanatediphenylmethane, 1,3- or 1,4-phenylene diisocyanate is used as polyisocyanate by itself or as it is added to the polymers. In the preferred embodiment of the invention, the molecular weight of the polyurethane prepolymer comprising water based blocked isocyanate groups is in the range of 1000-10000 g/mol, in one embodiment of the invention this value is between 1500-3000 g/mol.

After adding polyisocyanate, latex is added (5). Within latex, there are butadiene-styrene-vinyl-pyridine monomers. In the preferred embodiment of the invention, the solid amount inside the latex is between 35-45% by weight.

The dipping solution is obtained by adding all materials mentioned in the previous steps into the water at room temperature and stirring it (6).

Different acrylic polymers, epoxies and polyisocyanates were used in different ratios and 8 compositions were prepared. The related table is given in FIG. 2, and strip adhesion values of these compositions are indexed according to strip adhesion value of Resorcinol-Formaldehyde-Latex (RFL) adhesive solution.

In the preferred embodiment of the invention, acrylic resin ratio of 1-7% by weight, epoxy in ratio of 0.6-2.5%, and polyisocyanate in ratio of 6-21% are used.

The dipping solution prepared with the inventive production method for cord fabrics (10) can be used in dipping cords such as nylon 6.6, nylon 6, polyethylene terephthalate, polyethylene naphthalate, rayon, aramide, and it is not limited to these. After the said cords are prepared in certain constructions (ply number and twist), it is dipped with the inventive dipping material and dried at between 100-150° C. and then cured at between 200-240° C. The dipped cords are pressed into the non-vulcanized (green) rubber composition in molds. The said composite material is generally cured at 170° C. under pressure for about 20 minutes, and the final cord is obtained.

In an exemplary embodiment of the composition, the amount of solid is determined as 15%, and pH is adjusted to 10-11 range by adding ammonium hydroxide (12). The inventive dipping solution method was used in dipping 2 layered, 1400 dtex value, 396×396 twisted nylon 6.6 cords. The dipped cords were first dried for 60 seconds at 130° C., then cured for 60 seconds at 235 and 230° C., respectively.

Acrodur 950 and 3515 were used as acrylic functional polymer. The said water based polymers comprise carboxylic acid, polybasic alcohol groups with 50% solid.

EX313 and EX614B were used as epoxy. EX313 is a glycerol based glycidyl epoxy, and EX614B is sorbitol based glycidyl epoxy resin. The said resins are 100% soluble in water.

Grilbond IL-6 or BN-27 was used as blocked polyisocyanate or polyurethane. Grilbond IL-6 is water based caprolactam blocked 1,4-phenylene diisocyanate with 60% solid. BN-27 is a water based polyurethane prepolymer comprising blocked isocyanates with 30% solid.

The solid amount of styrene-butadiene-vinyl-pyridine latex is 41%, and pH value is 10.5

It is possible to obtain a dipping solution for rubber composites by using environmental friendly chemicals with the inventive dipping solution production method (10). Furthermore, the said method provides opportunities such as cost and time saving. Since the final product is white it is aesthetically appealing and also enables cord fabrics to be produced in various colors with pigment additives.

Within the framework of these basic concepts, it is possible to develop various embodiments of the inventive dipping material for cord fabrics and a production method thereof. The invention cannot be limited to the examples described herein and it is essentially as defined in the claims.

The invention claimed is:

1. A method for producing a RFL (resorcinol-formaldehyde) free dipping solution for cord fabrics comprising the steps of
   (a) adding acrylic polymer resin into water,
   (b) raising pH,
   (c) adding epoxy,
   (d) adding polyisocyanate,
   (e) adding latex, wherein the latex comprises butadiene, styrene and vinyl monomers, and is not the acrylic polymer, and wherein the solid amount inside the latex is between 35-45% by weight, and
   (f) obtaining the dipping solution,
wherein the acrylic polymer resin has carboxylic acid functionality and wherein the dipping solution comprises the acrylic polymer resin in an amount of 1-7% by weight, the epoxy in an amount of 0.6-2.5% by weight and the polyisocyanate in an amount of 6-21% by weight.

2. The method according to claim 1, wherein the carboxylic acid is at least one monomer selected from acrylic acid, methacrylic acid, itaconic acid, crotonic acid, cinnamic acid, or maleic acid.

3. The method according to claim 1, wherein the pH is adjusted by adding ammonium hydroxide until the pH value is 10-11.

4. The method according to claim 1, wherein the epoxy material is a water soluble or water based dispersion.

5. The method according to claim 1, wherein the epoxy is selected from glycidyl based glycerol, sorbitol epoxy, phenol novalac epoxy or cresol novalac epoxy.

6. The method according to claim 1, wherein the polyisocyanate is polyurethane polymer with blocked isocyanate groups.

7. The method according to claim 1, wherein the polyisocyanate is selected from at least one of tetramethylene diisocyanate, hexamethylene diisocyanate (1,6-diisocyanatohexane), octamethylene diisocyanate, decamethylene diisocyanate, dodecamethylene diisocyanate, 2,4- or 2,6-tolylene diisocyanate, tetramethylxylylene diisocyanate, p-xylene diisocyanate, 2,4'- or 4-4'-diisocyanatediphenylmethane, 1,3- or 1,4-phenylene diisocyanate.

8. The method according to claim 1, further comprising the step of adding the materials from steps (a)-(f) into the water and stirring at room temperature.

9. A dipping solution for cord fabrics obtained by the method according to claim 1.

10. The dipping solution of claim 9, wherein the cord fabrics are selected from nylon 6,6, nylon 6, polyethylene terephthalate, polyethylene naphthalate, rayon or aramide cord.

* * * * *